United States Patent [19]

Twaalfhoven et al.

[11] Patent Number: 4,906,878
[45] Date of Patent: Mar. 6, 1990

[54] FLUID CIRCULATED LINEAR MOTOR FOR ROBOTIC SYSTEMS

[75] Inventors: Mark C. J. Twaalfhoven, Hermosa Beach; Farshad Farzan; Sol Roufeh, both of Encino, all of Calif.

[73] Assignee: Fanamation, Inc., Compton, Calif.

[21] Appl. No.: 211,587

[22] Filed: Jun. 27, 1988

Related U.S. Application Data

[63] Continuation of Ser. No. 916,508, Oct. 8, 1986, abandoned.

[51] Int. Cl.$^4$ ............................................. H02K 41/00
[52] U.S. Cl. ........................................ 310/12; 310/16; 310/17; 310/64; 318/135
[58] Field of Search ...................... 310/12-17, 310/22, 53, 64, 233; 318/38, 135; 33/1 M; 324/73 PC, 158 F; 417/50; 901/2, 16, 23, 44

[56] References Cited

U.S. PATENT DOCUMENTS

| | | | |
|---|---|---|---|
| 3,906,261 | 9/1975 | Ogura et al. | 310/12 |
| 3,913,045 | 10/1975 | Starck | 310/13 |
| 4,155,173 | 5/1979 | Sprandel | 33/1 M |
| 4,300,066 | 11/1981 | Butler, III | 310/53 |
| 4,560,911 | 12/1985 | Chitayat | 318/135 |
| 4,563,820 | 1/1986 | Isohata | 33/1 M |
| 4,641,065 | 2/1987 | Shibuki | 310/13 |
| 4,788,477 | 11/1988 | Teramachi | 310/12 |

FOREIGN PATENT DOCUMENTS

| | | |
|---|---|---|
| 2202426 | 7/1973 | Fed. Rep. of Germany . |
| 2050624 | 4/1971 | France . |
| 2233739 | 1/1975 | France . |
| 0170247 | 7/1986 | Japan .............................. 310/12 |
| 0853750 | 8/1981 | U.S.S.R. ........................... 310/16 |

OTHER PUBLICATIONS

Patent Abstracts of Japan; vol. 10, No. 379, (E-465) (2436), 18 Dec. 1986, Application No. 61170247 (Toshiba) 31 Jul., 1986.
Patent Abstracts of Japan; vol. 9, No. 274, (E-354) (1997), 31 Oct., 1985, Application No. 60118039 (sumitono Denki Kogyo K.K.) 25 Jun., 1985.
Patent Abstracts of Japan, vol. 6, No. 164, (E-127) (1042) Canon K.K., 24 May, 1982.
Attached as Exhibit 1 is a sheet depicting custom designed liquid cooled linear motors, with no knwon model numbers and are referred to only as "Normal Liquid Cooled Motors", prior to Feb. 1986 by Northern Magnetics, Inc., 16124 Wyandotte St., Van Nuys, Calif.
Attached as Exhibit 2 is an undated product brochure entitled: "Anoline Linear DC Motors" of the Anorad Corp., 110 Oser Ave., Hauppage, N.Y. 11788.

Primary Examiner—R. Skudy
Attorney, Agent, or Firm—Timothy T. Patula

[57] ABSTRACT

A linear motor comprised of a plurality of primary coils arranged and spaced sequentially. A fluid intake manifold and a fluid exhaust manifold with at least one conduit in fluid communication between the intake and exhaust manifolds, such that the fluid intake manifold, fluid exhaust manifold and conduit are associated with the primary coils to control the temperature of the motor.

A robotically controlled linear motor apparatus for manipulating physical arms in one or more dimensions, with at least one linear motor comprised of primary coils sequentially and spacially arranged and a secondary coil positioned magnetically adjacent to the primary coils. A fluid circulating manifold as described above. A commutator for selectively energizing the primary and secondary coils to create a magnetic imbalance therebetween so that the secondary coil is urged in a direction opposite to that of the flux imbalance. A first arm is fixed to one the secondary coils and a second arm is fixed to the primary coils so that when a secondary coil moves, the first arm moves in reference to the second physical arm. A control for manipulating the first physical arm in one or more dimensions by selectively energizing the commutator to energize the linear motor causing the secondary coil and attached physical arm to move in relation thereto.

4 Claims, 4 Drawing Sheets

FIG. 1

FLUID CIRCULATED LINEAR MOTOR FOR ROBOTIC SYSTEMS

This is a continuation of application Ser. No. 916,508, fled on Oct. 8, 1986, now abandoned.

This invention relates to a fluid circulated linear motor for use in any motion control or robotic systems and for high speed measurement and inspection systems.

BACKGROUND OF THE INVENTION

In the past, linear motors were of limited applicability to any system needing high speed and power capabilities with large duty cycles because of the many inherent physical design problems of linear motors. Conventional linear motors have had limited applicability to systems controlled and implemented by high speed computers such as robotic measurement and inspection machines.

By their design, conventional linear motors have limited efficiencies because the operative magnetic flux produced can not be fully encapsulated and applied for use as a motive force. Because of their generally rectangular design and open drive path, linear motors lose much of the magnetic flux produced by their coils and primary cores to the surrounding environment, unlike typical rotary motors which are able to concentrate the magnetic flux produced within a closed rotary drive path.

In order to perform measurement or inspection tasks at a cost effective high rate of speed and at a significant power, large amounts of current are required to drive the linear motors which, because of their inherently inefficient design, resulted in large heat buildups causing not only motor failure but physical deformation of the surrounding machine. In order for a linear motor to be used at a high speed for a long period of time, the current must be increased. However, as the current increases two-fold the heat produced by the motor will result in an increase by the square, or four-fold in this example, resulting in linear motors being unacceptable for many applications. For example, if a conventional linear motor is operated at a high speed for a long period of time, the motor's temperature would greatly increase causing the geometrical dimensions and tolerances of a measurement and inspection machine to deform, providing inaccurate and unreliable data.

Conventional linear motors for use in highly accurate measurement and inspection systems have been operated inefficiently at low currents and therefore slow speeds so that the motor temperature would remain relatively constant at a low temperature. In order to perform high speed measurements and inspections, such as in a manufacturing environment where 100% inspection is required, the linear motor must be operated at high currents with high duty cycles resulting in high motor temperatures with substantial risk that the motor will fail or the machine will deform and be out of tolerance providing inaccurate temperature data. Therefore, in many critical temperature applications, linear motors have had very limited applicability because of the resulting heat generated from their use at high speeds for long time periods.

Additionally, the problem of cooling motors of this type have been addressed in the past by attempting to cool the exterior of the motor. These methods have afforded some minor improvement, but were unable to remove enough heat to run a linear motor at high speed with sufficient power and a sufficiently large duty cycle under the control and implementation of a high speed control system or computer.

Other driving methods for high speed inspection and measurement systems have used belt, rotary leadscrew, friction or rack and pinion drives. These types of drives do not afford the accuracy, reliability and duty-cycle needed for many critical high speed and high accuracy systems, especially in computerized state of the art robotic inspection and coordinate measurement systems.

OBJECTS OF THE INVENTION

It is a principle object of the present invention to remove heat from the coil and windings of a linear motor to prevent excessive temperatures from causing insulation breakdown from occurring because of the excessive heat produced when linear motors are operated at high current levels in order to achieve the power and speed specifications necessary for many present day applications.

It is a further object of the present invention to provide an efficient manner of cooling a linear motor without disruption or degradation of its performance, while being implemented at a reasonable cost through the use of a simple fluid circulation sub-system to adequately cool and control the motor's temperature.

It is still a further object of the present invention to provide a fluid-circulated linear motor that operates at a cooler temperature than herebefore available in temperature-sensitive applications. This is especially important in measurement and inspection systems, so that the motor does not affect the results and performance of the inspection and measurement process. It is particularly important to cool the linear motor sufficiently to prevent the system's thermal coefficient and expansion factors from being altered by the heat produced by the motor adjacent and proximate the machine.

It is another fundamentally important object of the present invention to remove the heat from a linear motor where it is generated so that the heat does not effect the functioning and life of the motor without drastically altering the structure of the motor itself.

BRIEF SUMMARY OF THE INVENTION

A fluid circulated linear motor having intake and exhaust manifolds extending parallel and proximate to the motor, with interconnecting cross-flow passageways extending between the individual primary coils of the motor positioned beneath or interwined with the primary coil's windings is disclosed as the preferred embodiment. The cross-flow passageways or tubes connect the intake and exhaust manifolds between the individual primary coils so that a fluid entering the intake manifold flows through each of the individual cross-flow tubes and out of the exhaust port of the exhaust manifold thereby removing heat from the coils. By pumping a fluid of an ambient temperature lower than that of the motor through the manifold and the cross-flow tubes, the operating temperature of the motor may be reduced or controlled.

A fluid-circulated linear motor is particularly applicable to robotic systems, and specifically robotic inspection and measurement machines. A robotic measurement and inspection system of the present invention is generally comprised of three basic units: a base assembly unit, a machine control unit and a robot assembly unit.

The base assembly unit is the overall support structure of the machine or the machine's frame. It may be comprised of steel weldments supporting usually a solid reference surface such as a granite slab. The robotic assembly unit is also supported and guided by a solid reference surface sometimes a granite beam. The entire base assembly unit may be suspended by pneumatic air suspension supports to vibrationally isolate the machine from its enviroment. The base assembly unit overall is designed to achieve stability and rigidity so that accurate and reliable measurements or inspections may be performed.

The machine control unit consists of a computer system which performs substantially three functions. First, it controls the movement, placement and positioning of the robot assembly unit to be described below. Second, it performs the data and/or measurement calculations of the inspection device. Third, the machine control unit coordinates and communicates with the operator as well as outside peripherals such as recording or indicating devices, printers, hard and soft disk drives Computer Aided Design/Computer Aided Manufacture Systems, remote location sequencing and other computer systems regarding the machine's status.

The third section of the overall measurement inspection system is the robot assembly unit. The robot assembly unit has several tasks. The main task for the robot assembly unit is to move an object such as a measurement or an inspection probe or a gripper or an articulating hand through a specified envelope area within the three dimensional operating space of the reference surface of the machine. The robot assembly is comprised of the robot arms which also may be guiding or support surfaces, or in some cases they may be other structural members. The robot arms float above the guiding surfaces by the use of low-lift gas bearings as a non-contact, friction free means of guiding the arms.

The robot arms may be propelled at a high speed and accurately positioned along the X, Y and Z axes by fluid circulated linear motors as described above. A feedback positioning device such as a glass linear scale, functions as a linear position encoder to the machine control unit to communicate the location of the robots arms and the measurement or inspection probe.

In order to achieve high speed, accuracy and long life, the entire system is of a non-contact type, with the gas bearings providing for a non-contact means of guiding the robot arms. Additionally, the use of glass linear scales and non-contact fluid circulated linear motors allow the individual robot arms to float without physical contact with one another. The robot measurement and inspection system allows for arm movement in the X, Y and Z plane without physical contact and affords high speed and accurate movement of the robot's arms without interference from the machine's surrounding environment by the use of the fluid circulated linear motor.

BRIEF DESCRIPTION OF THE DRAWINGS

A further understanding of the foregoing may be had by reference to the accompanying drawings, wherein.

DETAILED DESCRIPTION OF THE INVENTION

While this invention is susceptible of embodiment in many different forms, there is shown in the drawings and will herein be described in detail a preferred embodiment of the invention disclosed herein, which is equally applicable to many configurations of linear motors and robotic systems besides the specific embodiment shown and described below. It should be understood, however, that the present disclosure is to be considered as an exemplification of the principles of the invention and does not intend to limit the spirit and scope of the invention, and/or claims, to the embodiment illustrated.

There are many advantages to the use of a fluid circulated linear motor for temperature sensitive applications such as robotic inspection and measurement systems. The main advantage is the ability to propel the robot at a high speed without producing the excessive heat that is associated with systems known herebefore. Secondly, a major advantage is to provide a means of propelling the robot not only at a high speed but also in complete physical isolation or without contact with the associated axes in order to insulate the measurement and/or inspection process from outside physical interference which may alter and impair the accuracy of the results obtained.

The use of a fluid-circulating manifold with cross flow tubes within and in physical proximity to the primary coil of a fixed linear motor allows substantial heat to be dissipated from the coil by transferring it to the fluid and dissipating it away. Such a method allows the linear motor to be operated at high currents and in turn, at high speeds and at high power levels without the disadvantage of excessive heat production and a physical transfer of the heat to the surrounding environs.

Figure 1:
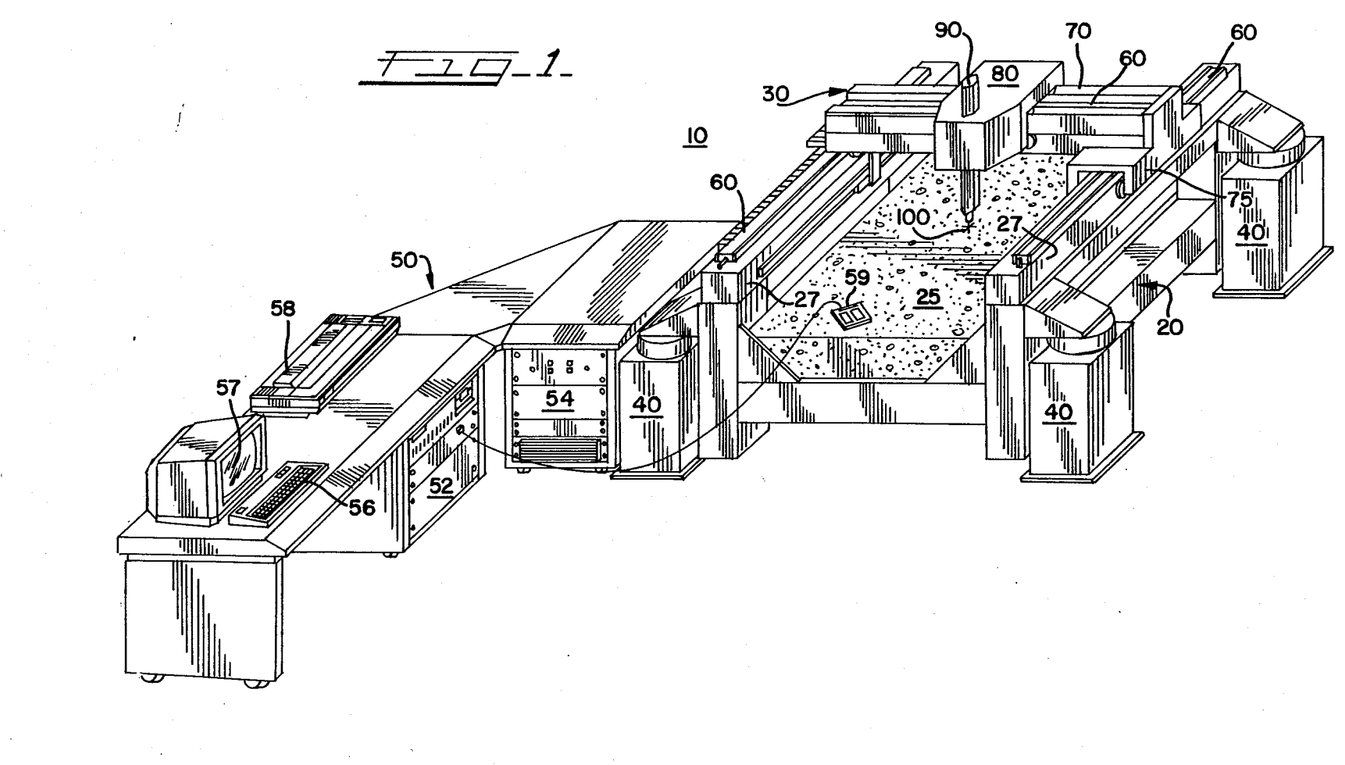
FIG. 1 is a perspective view of the overall robotic inspection and measurement system of the present invention.

FIG. 1 is a prospective view of the overall robotic inspection and measurement system of the present invention. The system 10 is comprised of the following components. A base reference support 20, a robot assembly unit 30 and a machine control unit 50. The reference support 20 is isolated by pneumatic stablized supports 40. Fluid circulated linear motors 60 are shown supported by the base reference support 20 and reference guides 27 and function by propelling the robot assembly unit 30 in various axes. In the preferred embodiment, three axes are shown for movement in the conventional X, Y and Z coordinate planes. A reference support surface 25 is supported by the base reference support 20. Additionally, reference guides 27 are supported by base base reference support 20 which are guiding supports for the fluid circulated linear motors 60.

In the preferred embodiment, the reference support surface 25 and the reference guides 27 may be fashioned from a solid stable material such as granite. The base reference support 20 may be configured as a rigid steel base frame in order to support the reference support surface 25 as well as the reference guide 27. Pneumatic stabilized supports 40 are used to isolate the machine from its supporting environment as well as isolate the environment from the operational effects of the system 10. Additionally, the pneumatic stabilized supports 40 ensure that the center of gravity of the reference support surface 25 as well as the base reference support 20 are fixed in such a way as to provide accurate results for the measurement and inspection processes and calculations performed.

The robot assembly unit 30, is comprised of physical members or robotic arms which is driven by fluid circulated linear motors 60, includes an overhead beam 70 which is positioned across the dual Y-axes of the inspection field. Overhead saddle unit 80 is slidably mounted upon the overhead beam 70 and is driven by a fluid-circulated linear motor 60 (not shown in FIG. 1) fixed to beam 70. Saddle unit 80 supports Z-axis probe 90 and is driven by a fluid-circulated linear motor 60 (not shown in FIG. 1) for movement of the probe in the vertical direction. The lowermost tip of Z-axis probe 90 is configured to accept a measurement or inspection probe 100 as desired for the particular operation of the system 10. The examining means or probe 100 is a conventional and well known in the art device used to inspect the various physical properties of a device such as its temperature, thickness, physical smoothness etc. Overhead beam 70 is supported upon and propelled from a bridge 75 which is affixed to the movable propelling portion of the fluid circulated linear motor 60.

A well known and conventional machine control and manipulating unit 50 in the form of a conventional computer is used for manipulating physical members or robotic arms and in turn the examining means or probe 100, by selectively energizing the linear motors 60 to cause the attached physical members to move in relation to each other. The machine control unit 50 of the preferred embodiment consists of a conventional or "off the shelf" computer system 52 with computerized access controller 54 for controlling the robot assembly unit 30. In which, an operator communicates with the system via a keyboard 56 and video monitor 57. A conventional printer device 58 is depicted for receiving and recording communication from the computer system 52 of the machine's status or of the data gathered. A remote control device 59 allows the computer system 52 and access controller 54 to be instructed while the operator is physically observing the inspection and measurement system 10.

Figure 2:
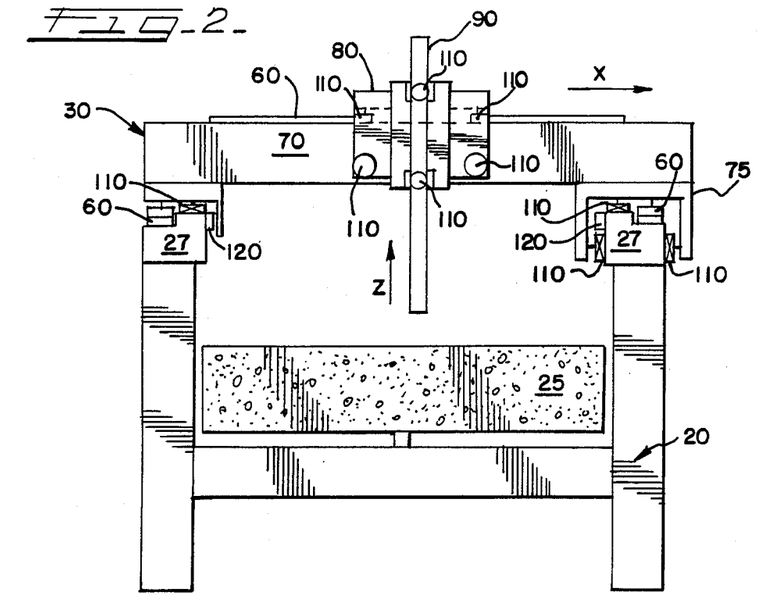
FIG. 2 is a partial front view of the robotic inspection and measurement system of the present invention.

FIG. 2 is a perspective front view of the robotic inspection and measurement system 10 of the preferred embodiment of the present invention. The base reference center 20 is shown supporting reference support surface 25 and reference guides 27 providing the guides for the Y-axes motion of travel for the robotic assembly unit 30 in which overhead beam 70 is shown spanning the X-axis and supported indirectly by reference guides 27. The bridge 75 is supported by gas bearings 110 which function by forcing air pressure upon the bearing surfaces to support the bearing fixed to the bridge 75 and overhead beam 70 from the reference guides 27.

The use of such gas bearings 110 provide no physical contact between the reference guides 27 and the robotic assembly unit 30. Fluid circulated linear motors 60 are shown fixedly positioned upon reference guides 27 and their movable portions fixed to bridge 75 and overhead beam 70. Linear position encoders 120 communicate the position of the Y-axis which is the overhead beam 70 to the robot control unit 50 for use in assessing the system's 10 status and physical location along the Y-axis. The linear position encoders 120 make no physical contact to the reference support guides 27 so that there is friction free movement between the robot assembly unit 30 and the base reference center 20.

The overhead beam 70 supports saddle unit 80 shown in partial cross section, as it is propelled by fluid circulated linear motor 60 and supported by gas bearings 110 along the top and sides of overhead beam 70. Linear position encoders 120 are fixed along the X-axis of overhead beam 70 to communicate the position and status of the saddle unit 80 to the robot control unit 50 (not shown). Saddle unit 80 supports the Z-axis probe 90 in a similar manner by gas bearings 110 and is propelled by a fluid circulated linear motor 60 (not shown).

Figure 3:
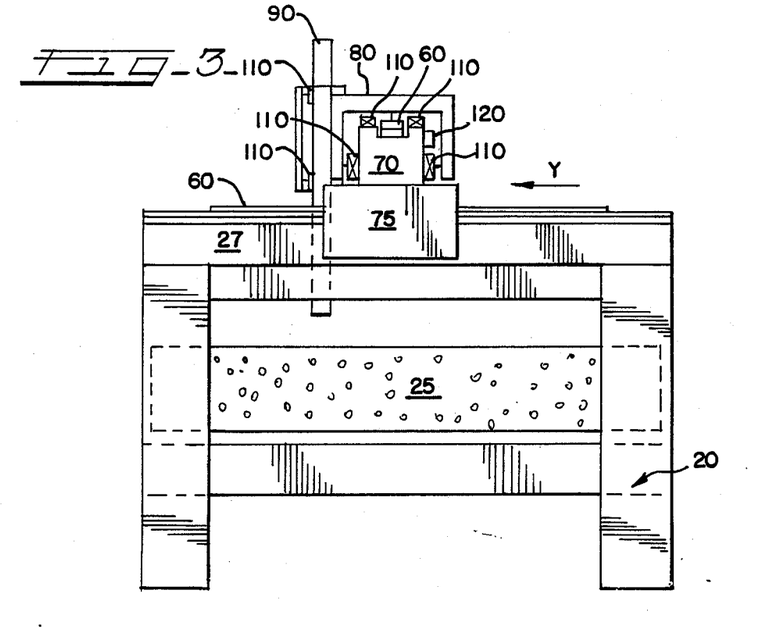
FIG. 3 is a partial side view of the robotic inspection and measurement system of the present invention.

FIG. 3 is a partial side view of the robotic inspection and measurement system 10 of the preferred embodiment of the present invention. Base reference center 20 is shown supporting reference support surface 25 and reference guides 27 in which bridge 75 is shown propelled by a fluid circulated linear motor 60 along the Y-axis direction and supporting overhead beam 70 in the X-axis direction, in which saddle unit 80 is supported thereupon. Saddle unit 80 is supported by gas bearings 110 and is propelled by a fluid circulated linear motor 60 along the X-axis. Z-axis probe 90 is shown supported within saddle unit 80 by gas bearings 110 and propelled by fluid circulated linear motor (not shown in FIG. 3). Linear position encoder 120 is shown positioned along the overhead beam 70 in order to communicate to the robot control unit 50 the status and physical location of the saddle unit 80 along the X-axis. A linear position encoder 120 is affixed onto saddle unit 80 in order to assess the status and position of Z-axis probe 90 (not shown in FIG. 3).

Figures 4, 5, 6:
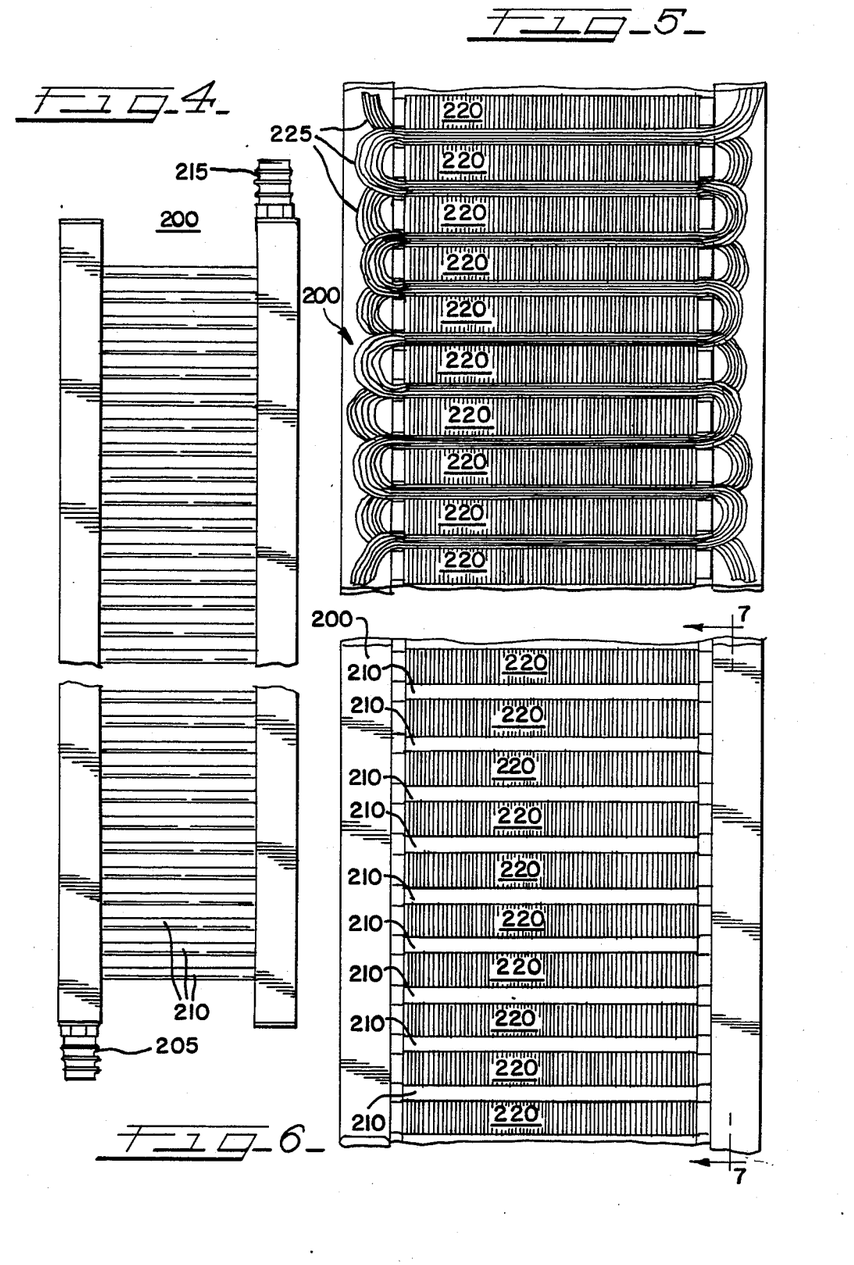
FIG. 4 is a partial view of the linear motor fluid circulated manifold with cross-flow tubes.
FIG. 5 is a partial section of the fluid circulated linear motor with its primary coil windings depicted.
FIG. 6 is a partial section of the linear motor manifold depicting the path of fluid flow through the manifold and cross flow tubes.

FIG. 4 is a partial view of the linear motor fluid circulated manifold 200. A fluid intake nozzle 205 for accepting a fluid to be circulated within the manifold 200 through multiple cross flow tubes 210 and generally exiting an exhaust manifold nozzle 215 is shown.

FIG. 5 is a partial section of the fluid circulated linear motor with primary coils means 220 shown interspersed between the cross flow tubes 210 and between the manifold's 200 intake and exhaust sections. Primary coil windings 225 are shown wound axially around coils 220 in physical proximity to manifold 200 and cross flow tubes 210.

FIG. 6 is a partial section of the fluid circulated linear motor manifold depicting the flow of a fluid through the manifold 200 and cross flow tubes 210. Primary coils 200 are shown interspersed between the cross flow tubes 210. The windings 225 as shown in FIG. 5 are omitted in FIG. 6 in order to reveal the cross flow tubes 210.

Figure 7:
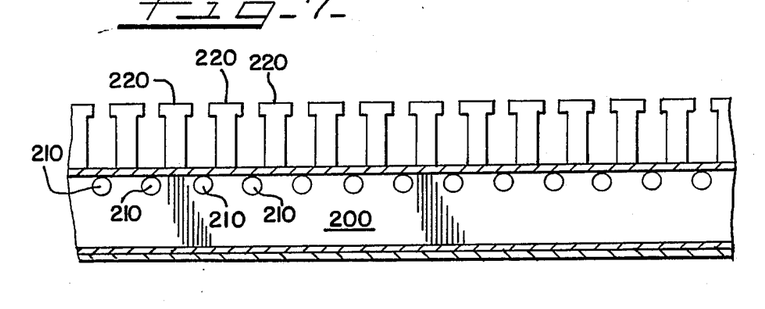
FIG. 7 is a partial section and cut-away side view along line 7—7 of FIG. 6 of the fluid circulated linear motor and manifold with cross-flow tubes revealed.

FIG. 7 is a partial section and cut-a-way side view along line 7—7 of FIG. 6 of the preferred embodiment of the fluid circulated linear motor with a cut-a-way view of the manifold 200 revealing the cross flow tubes 210 interspersed and in physical proximity to the primary coils 220.

Figure 8:
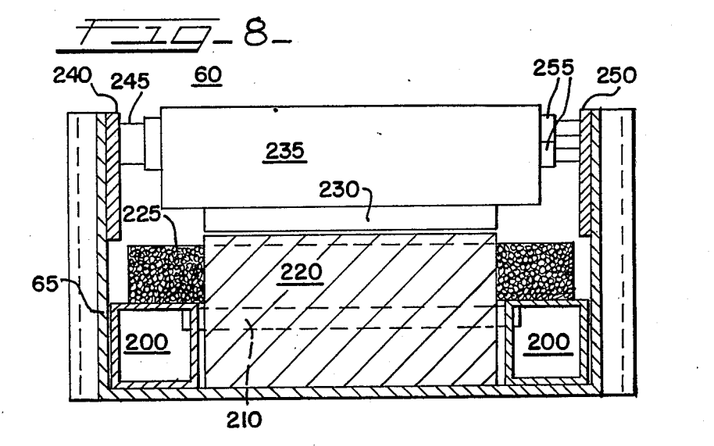
FIG. 8 is an end and cross-sectional view of the fluid circulated linear motor.

FIG. 8 is an end and cross-sectional view of the fluid circulated linear motor 60 mounted upon a support channel 65 in which manifold 200 is supported thereby in which cross flow tube 210 is shown interconnecting manifold sides 200 beneath or imbedded with primary coils 220 in which a cross section of primary coil windings 225 are shown wrapped axially around primary coil 220. Permanent magnets 230 are shown fixed above primary coil 220 creating an air gap in which permanent magnet 230 is fixed to secondary coil means 235. Primary coil commutator means 240 is shown depicted supported by support channel 65 and brush coil contacts 245. Primary coil means 220 and secondary coil means 235 make up the commutator assembly means for selectively energizing and producing a magnetic flow in said primary coil means 320 and the secondary coil means 235 such that the resulting interaction of magnetic fluxes urges the secondary coil means 235 to move in a desired direction. Input commutator 250 is supported by support channel 65 providing contact with input brushes 255 to the secondary coil 235. It should be noted that depicted in these drawings is only one of many different embodiments and that the invention may also be readily configured for use with brushless motors or any other means of energizing a primary and secondary type coil.

Figure 9:
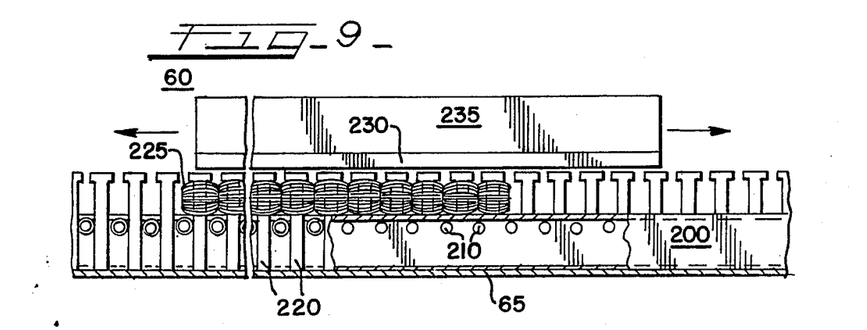
FIG. 9 is a side view in partial cross sections of the fluid circulate linear motor depicting the travel of the secondary coil.

FIG. 9 is a side view in partial cross section of the fluid circulated linear motor 60 in which support channel 65 is shown supporting manifold 200. Manifold 200 is shown in partical cross section to reveal cross flow tubes 210 interspersed between primary coils 220 in which partial views of primary coil windings 225 are shown wound axially around primary coil 220. Permanent magnets 230 are shown magnetically adjacent and above primary coils 220 creating an air gap. Permanent magnets 230 are supported by secondary coil 235. Secondary coil 235 is shown depicted in its motion of travel along the path provided by primary coils 220 and primary coil windings 225.

The operation of the present invention is simply and effectively described as follows. As shown in FIG. 4, a fluid-circulating manifold 200 and cross flow tubes 210 are positioned between the primary coils 220 of a linear motor. The primary coil windings 225 are wound around the primary coils 220 as shown. A fluid is passed into the intake manifold nozzle 205 and exits the exhaust manifold nozzle 215, so that when the linear motor 60 is driven by a high current to operate the linear motor 60 at high speed, the heat dissipated from the windings 225 and coils 220 is absorbed by the fluid of the manifold 200 and cross flow tubes 210 and removed. The heated fluid is cooled before being recirculated to the linear motor 60.

The motor 60 operates, as shown in FIG. 8, by energizing the primary coil commutators 240 and input commutators 250, which are in contact with brush coil contacts 245 and input brushes 225, respectively, such that secondary coil 235 and permanent magnet 230 are placed in a state of magnetic flux imbalance across an air gap created between the corresponding surface of primary coil 220 which is energized by the primary coil windings 225 wound around the primary coils 220 and cooled via the fluid circulated manifold 200 and cross flow tubes 210 such that the excess energy transformed into heat is removed by the circulating fluid in order to keep the linear motor 60 cooled. The magnetic flux imbalance caused between the secondary coil 235 and the primary coil 220 causes the secondary coil 235 to be urged in a direction opposite the force exerted by the magnetic flux imbalance. FIG. 9 depicts the physical relationship of the secondary coil 235 and permanent magnet 230 in magnetic relationship with the primary coils 220 representing the prospective travel of the secondary coil 235 and permanent magnet 230.

In certain applications the fluid circulated linear motor of the present invention may be applied in environments which the surrounding temperature is less than the ambient temperature of the motor. In such situations, the fluid-circulating through the motor may be of a higher temperature than the ambient temperature of the motor in order to increase the motor's ambient temperature. Additionally, the method of circulating a fluid through a motor may be performed by an automatic sensing system in order to raise or lower the temperature of the circulating fluid in response to the motor's ambient operating temperature.

The fluid-circulating linear motor of the preferred embodiment of the present invention is particularly useful in robotic systems applications. In applications needing accuracy at high speeds with a high duty cycle, a fluid circulated linear motor is especially well suited to implementing physical arms or members in one or more dimensions in order to perform a desired task. As described above, a fluid circulated linear motor is specifically applicable to systems which must operate at a very high speed and a high duty cycle so that the corresponding heat, will not cause the motor to fail nor effect the surrounding robot's environment.

In general, the primary coil 220 with associated manifold 200 and primary coil windings 225 as affixed to motor support channel 65 are affixed to a first physical member stationary member either as the robot's support or on a movable robot arm. Correspondingly, permanent magnet 230 and secondary coil 235 complete the linear motor 60 and are movable along the path of travel of the linear motor 60 such that the robot arm is fixed to the secondary coil 235 and is able to be positioned and propelled by the movement of the linear motor 60. Alternatively, the permanent magnet 230 and secondary coil 235 may be fixed to a stationary member with primary coil 220 and associated manifold 200 attached to a robot arm which is capable of movement along the motor's 60 path of travel by magnetic interaction. Depending on the application and purpose of the robotic system, any number of fluid circulated linear motors may be configured to operate in any dimension in order to position an articulating hand, probe, inspection device or other device as required.

One of the preferred applications for a fluid circulated linear motor as shown in FIG. 3 is a measurement and inspection system. Such a system is operated generally as follows. An item or device to be measured or inspected, is placed upon the reference support surface 25. A measurement or inspection probe (now shown) within the envelope of the reference support system 25, is maneuvered by the remote control device 59 to position the probe within the envelope. As seen in FIG. 1, the probe 100 is attached to the Z-axis probe 90 as positioned by saddle unit 80 along the X-axis depicted as overhead beam 70 and along the Y-axes depicted as reference guides 27 and as positioned by bridge 75. Each of the X, Y and Z-axes are propelled and accurately positioned by the utilization of a fluid circulated linear motor 60. The operator via the remote control device 59 or through keyboard 56, instructs the computer system 52 and access controller 54 to position the probe 100 to locate the desired device positioned on reference support surface 25 and conduct the appropriate measurement and inspection function as instructed by a program or set of instructions embodied in software to be implemented and instructed by the access controller 54 and computer 52. The operator may commence, modify, or halt any or all of the functions of measurement and/or inspection via the keyboard 56. The video monitor device 57 informs the operator of the status and position of the robot assembly unit 30 in relationship to the device to be measured or inspected.

The computer 52 and access controller 54 are controlled via information inputted through the keyboard 56 and displayed and monitored by video monitor device 57. The measurement and inspection data may be recorded and stored by being printed on printing device 58. The system 10 is capable of being configured to perform any number of tasks at a high speed in a short period of time and afford manufacturing and inspection facilities the ability to perform 100% inspection services.

Referring now to FIG. 3, upon the command of an operator via keyboard 56 through computer 52 and access controller 54, fluid cooled linear motors 60 are positioned as desired along both reference guides 27 for the Y-axes or along overhead beam 70 for the X-axis or along the Z-axis probe 90 in relationship to the X, Y, Z coordinate system.

Any of the desired motions are accomplished by the linear motor's magnetic flux imbalance created between the primary and secondary coils of the linear motor, to propel the appropriate axis to the desired location. Gas bearings 110 are applied along each of the axes in order to make the individual axes or arms of the robot assembly unit float and be without physical contact of the supporting surface thereby reducing wear and eliminating potentially conflicting forces from the environment from interfering with the accuracy of the data collected or inspection tasks performed. Linear position encoders 120 are positioned along each of the X, Y or Z-axes in such a manner to communicate to the access controller 54 and there in turn, the computer 52, as to the specific location each of the axes is positioned in relationship to the other so as to insure the proper accuracy and functioning of the overall measurement and inspection system.

Shown in FIG. 3, is the Y-axis in which bridge 75 is positioned along reference guide 27 which in turn supports overhead beam 70 providing a nonfrictional contact with the saddle unit 80 by the use of gas bearings 110 and is propelled by a fluid circulated linear motor 60. Its position is referenced by linear position encoder 120. Saddle unit 80 supports in a like manner the Z-axis probe 90, through the use of gas bearings 110 and is propelled (though not shown) by a linear motor 60 and is referenced for position by a linear position encoder 120 (also not shown).

While the foregoing has presented certain specific embodiments of the present invention, it is to be understood, that these embodiments have been presented by way of example only. It is expected that others will perceive variations which, while differing from the foregoing, do not depart from the spirit and scope of the invention as herein described and claimed.

What is claimed is:

1. A fluid-circulating linear motor, comprising:
   primary coil means for creating a magnetic flux having at least two contacts;
   moveable secondary coil means for creating a magnetic flux positioned in complementary physical proximity to said primary coil means;
   commutator assembly means for selectively energizing said primary coil and said secondary coil producing a magnetic flux from said primary coil and said secondary coil means such that the resulting interaction of magnetic fluxes urges said secondary coil to move in a desired direction; and
   manifold means for circulating a fluid adjacent to said primary coil means, said manifold means in fluid communication with cross flow tubes substantially associated with said primary coils means, wherein a fluid is circulated through said manifold means and said cross flow tubes to transfer energy between said primary coil and said manifold means to control the temperature of said primary coil means.

2. The motor claimed in claim 1, wherein said fluid is circualted through said manifold means to transfer heat from said manifold means to said primary coil means to increase the temperature of said primary coil means.

3. The motor claimed in claim 1, wherein said fluid is circulated through said manifold means to transfer heat from said primary coil to said manifold means to decrease the temperature of said primary coil means.

4. A fluid-circulating linear motor comprising:
   primary core means for creating a magnetic flux by windings wound around at least two contacts;
   secondary coil means for creating a magnetic flux positioned in magnetic proximity to said primary core means;
   fluid circulating manifold means having an intake manifold, and an exhaust manifold, and a plurality of cross-flow tubes in fluid communication between said intake manifold and said exhaust manifold, said manifold means positioned adjacent said primary core and said windings to control the temperature of said primary core means;
   commutator means for selectively energizing said windings of said primary core means and energizing said secondary coil means such that the interaction of the magnetic flux produced between said primary core means and said secondary coil means urges said secondary coil means in a direction opposite to that of the flux imbalance.

* * * * *

UNITED STATES PATENT AND TRADEMARK OFFICE
CERTIFICATE OF CORRECTION

PATENT NO. : 4,906,878

DATED : March 6, 1990

INVENTOR(S) : Twaalfhoven et al.

It is certified that error appears in the above-identified patent and that said Letters Patent is hereby corrected as shown below:

```
Column 1, line 6, change "fled" to --filed--;

Column 4, line 68, change "base base" to --base--;

Column 6, line 59, change "200" to --220--;

Column 7, line 57, change "225" to --255--;

Column 8, line 38, after "such that" insert --second
     physical member--;

Column 10, line 18, after "said secondary coil" delete
     "means";

Column 10, line 30, change "circualted" to "circulated--.
```

Signed and Sealed this

Fifth Day of May, 1992

Attest:

DOUGLAS B. COMER

*Attesting Officer*      *Acting Commissioner of Patents and Trademarks*